United States Patent

Kishiro et al.

[11] Patent Number: 5,773,727
[45] Date of Patent: Jun. 30, 1998

[54] MASS FLOW METER

[75] Inventors: Masami Kishiro; Keita Ohkawa; Hironobu Yao; Iwao Matsumoto, all of Kawasaki, Japan

[73] Assignee: Fuji Electric Co., Ltd., Japan

[21] Appl. No.: 544,367

[22] Filed: Oct. 17, 1995

[51] Int. Cl.⁶ .................................................. G01F 1/78
[52] U.S. Cl. .................................................. 73/861.355
[58] Field of Search ................ 73/861.356, 861.355, 73/861.38

[56]  References Cited

U.S. PATENT DOCUMENTS

| | | | |
|---|---|---|---|
| 4,768,384 | 9/1988 | Flecken et al. | 73/861.356 |
| 5,065,612 | 11/1991 | Ooka et al. | 73/1 D |
| 5,323,658 | 6/1994 | Yao et al. | 73/861.355 |
| 5,381,697 | 1/1995 | Van Der Pol | 73/861.356 |
| 5,398,554 | 3/1995 | Ogawa et al. | 73/861.355 |
| 5,497,665 | 3/1996 | Cage et al. | 73/861.38 |

FOREIGN PATENT DOCUMENTS 63-158420  7/1988  Japan .
6-94501    4/1994  Japan .

*Primary Examiner*—Ronald L. Biegel
*Assistant Examiner*—Jewel Artis
*Attorney, Agent, or Firm*—Rossi & Associates

[57] ABSTRACT

A mass flow meter provides improved accuracy in measuring the mass flow rate of a fluid flowing through a straight measuring tube. The as measured mass flow rate value is changed by parameters such as the Young's modules, second moment of area, length, axial force, etc. of the measuring tube. The parameters change with the strain caused in the axial direction of the measuring tube. A strain sensor is installed on a measuring tube, and the as measured mass flow rate is corrected based on the output of the strain sensor. Since the strain affects in a different way the substantial mass flow rate and the zero point offset, the correction is conducted separately on the substantial mass flow rate and on the zero point offset so that the accuracy of measurement may be improved. Since the parameters change also with the temperature of the measuring tube, a temperature sensor is also installed on the measuring tube so that the accuracy of measurement may be further improved.

5 Claims, 4 Drawing Sheets

MASS FLOW METER

FIELD OF THE INVENTION

The present invention relates to a Coriolis-type mass flow meter that measures a mass flow rate of a fluid in question based on the reactive force generated by accelerating the fluid as it flows through a straight measuring tube. More specifically, the invention relates to a mass flow meter that corrects a measured mass flow rate based on a measured strain in the axial direction of the measuring tube and a temperature of the measuring tube to improve the accuracy of mass flow rate measurement.

BACKGROUND

A conventional Coriolis-type mass flow meter is disclosed in the Japanese Examined Patent Publication (Kokoku) No. S60-34683. FIG. 7 is an isometric view of the conventional mass flow meter that includes a U-shaped measuring tube 2 fixed to a housing 19 with fixed (cantilever) mounts at both ends. A beam like resonator 120 is fixed to the housing 19 with fixed (cantilever) mount at an end (bottom) between both ends 31 and 32 of the U-shaped measuring tube 2. The natural frequencies of the U-shaped measuring tube 2 and the resonator 120 are set to be the same so that the measuring tube 2 and the resonator 120 may resonate with one another. A driver 5 comprised, for example, of a coil and a magnet is disposed between the bottom of the U-shaped measuring tube 2 and the top (the other end) of the resonator 120. The U-shaped measuring tube 2 and the resonator 120 are vibrated at the resonant frequency by the driver 5 and a driver circuit 8. Speed sensors 6a and 6b comprised of a coil and a magnet are fixed to both ends of the straight bottom of the U-shaped measuring tube 2. The output signals from the speed sensors 6a and 6b are input to a signal processing circuit 9 and converted therein to a flow rate signal. Detecting means for detecting the vibration of the measuring tube 2 are not limited to speed sensors such as the sensors 6a and 6b. Any sensors which can detect the vibration of the measuring tube, such as displacement sensors, acceleration sensors, etc., may be used for detecting the vibration of the measuring tube 2.

The fluid in question flows in a direction indicated by an arrow U from an inlet tube (not shown) into the U-shaped measuring tube 2, and flows out in a direction indicated by an arrow D to an outlet tube (not shown) from the U-shaped measuring tube 2 after flowing through the measuring tube 2. In a first case, in which the flow rate of the fluid is zero, the U-shaped measuring tube 2 and the resonator 120 are vibrated at the resonant frequency by the driver 5 and the driver circuit 8. Since the positions at which the speed sensors 6a and 6b are fixed to execute the same movement, the output signals output from the speed sensors 6a and 6b include no phase difference between them. In a second case, in which the fluid is flowing, the fluid flows through the vibrating measuring tube 2 and the Coriolis force is generated perpendicularly to the fluid velocity. Since the flow directions are opposite to one another between both arms of the U-shaped measuring tube 2, the directions of the generated Coriolis force are also opposite to one another. Therefore, moment is generated with respect to the O axis that is the central axis of the U-shaped measuring tube. Due to the generated moment, a torsional vibration with respect to the 0 axis is superimposed on a bending vibration with respect to the axis W—W connecting the ends 31 and 32 of the measuring tube 2. Because of this, the output signals output from the speed sensors 6a and 6b are detected as the signals having a phase difference (time difference) between them. Since the Coriolis force is proportional to the mass flow rate, the phase difference detected from the output signals output of the speed sensors 6a and 6b is also proportional to the mass flow rate. Therefore, the mass flow rate of the fluid is measured by measuring the phase difference (time difference) between the output signals of the sensors.

The requirement of shaping a measuring tube in the U-shaped as shown in FIG. 7 or in the other curved shapes causes a number of drawbacks including: (1) large pressure loss; (2) difficulty in cleaning the measuring tube; (3) difficulty in draining the fluid remaining in the measuring tube after the measurement is over; and (4) the outer dimensions of the mass flow meter are large. While these problems may be solved by using a straight measuring tube, a straight measuring tube causes other inherent problems. For example, stress or strain is caused and changed in the axial direction of the straight measuring tube by temperature change of the fluid in question or the environment. The effects of the stress or strain negatively impacts the measured value of the mass flow rate and causes a further measurement error.

In view of the foregoing, it is an object of the present invention to provide a Coriolis-type mass flow meter that measures a mass flow rate of a fluid in question based on the reactive force generated by accelerating the fluid as it flows through a straight measuring tube, and facilitates improving the accuracy of measurement by correcting the as measured mass flow rate value based on the measured strain in the axial direction of the measuring tube and the temperature of the measuring tube.

SUMMARY OF THE INVENTION

According to an aspect of the invention, a mass flow meter is provided for measuring a mass flow rate of a fluid in question based on the reactive force generated by accelerating the fluid flowing through a straight measuring tube. The mass flow meter includes a sensing means for detecting the state of the measuring tube, and a correcting means for correcting the as measured value of the mass flow rate based on the output of the sensing means. The correcting means preferably comprises a mass flow rate correcting means for correcting a part of the as measured value corresponding to the substantial mass flow rate of the fluid, and a zero point correcting means for correcting a part of the as measured value corresponding to a zero point offset remaining when the fluid is not flowing. The sensing means preferably comprises a strain sensor for detecting the strain caused in the axial direction of the measuring tube, or a temperature sensor for detecting the temperature of the measuring tube. The sensing means also preferably comprises a strain sensor for detecting the strain caused in the axial direction of the measuring tube, and a temperature sensor for detecting the temperature of the measuring tube. It is also preferable to provide the mass flow meter with a frame for fixing the measuring tube at the nodes of vibration thereof, and to install a first temperature sensor for detecting the temperature of the measuring tube, and a second temperature sensor for detecting the temperature of the frame.

According to another aspect of the invention, a mass flow meter is provided that includes a detector unit comprising a measuring tube, a frame for fixing the measuring tube at the nodes of vibration thereof, and a driving means for vibrating the measuring tube, and a vibration detecting means for detecting the vibration of the measuring tube, a housing for fixing the extended sections of the measuring tube thereto and for suspending the detector unit therein, a temperature sensor for measuring the temperature of the measuring tube, the temperature sensor being installed on a mid-point between a first location, therein the measuring tube is fixed to the frame, and a second location, therein the measuring tube is fixed to the housing, and a correcting means for correcting the as measured value of the mass flow rate based on the output of the temperature sensor.

According to an aspect of the invention, the mass flow rate correcting means corrects a part of the measured value corresponding to the substantial mass flow rate based on the output of the sensing means, and the zero point correcting means corrects a part of the measured value corresponding to a zero point offset. As a result the as measured mass flow rate is totally corrected. The correction is conducted based on the principle described below. The as measured mass flow rate value is changed by the parameters such as the Young's modules, second moment of area, length, axial force, etc. of the measuring tube. The parameters change with the strain caused in the axial direction of the measuring tube, the temperature of the measuring tube, etc. Therefore, a temperature sensor and a strain sensor are provided to the mass flow meter, and the as measured mass flow rate value is corrected based on the output signals of the sensors. Since the strain and temperature of the measuring tube affect in the different way to the substantial mass flow rate and the zero point offset of the as measured value, the substantial mass flow rate and the zero point offset are corrected separately so that the measurement accuracy may be improved.

Further, the strain in the axial direction of the measuring tube is obtained from the output of the first temperature sensor for detecting temperature of the measuring tube and from the output of the second temperature sensor for detecting the temperature of the frame and the terminal expansion coefficients of the measuring tube and frame, and the correcting means corrects the as measured mass flow rate value by the obtained strain and the output of the first temperature sensor. In accordance with another aspect of the invention, a temperature sensor is installed on a mid-point between a first location, therein the measuring tube is fixed to the frame, and a second location, therein the measuring tube is fixed to the housing so that the influence of the temperature sensor on the vibration of the measuring tube may be suppressed.

BRIEF DESCRIPTION OF THE DRAWINGS

The invention will be described in greater detail with reference to the accompanying drawings, wherein.

DETAILED DESCRIPTION OF THE PREFERRED EMBODIMENTS

Figure 1:
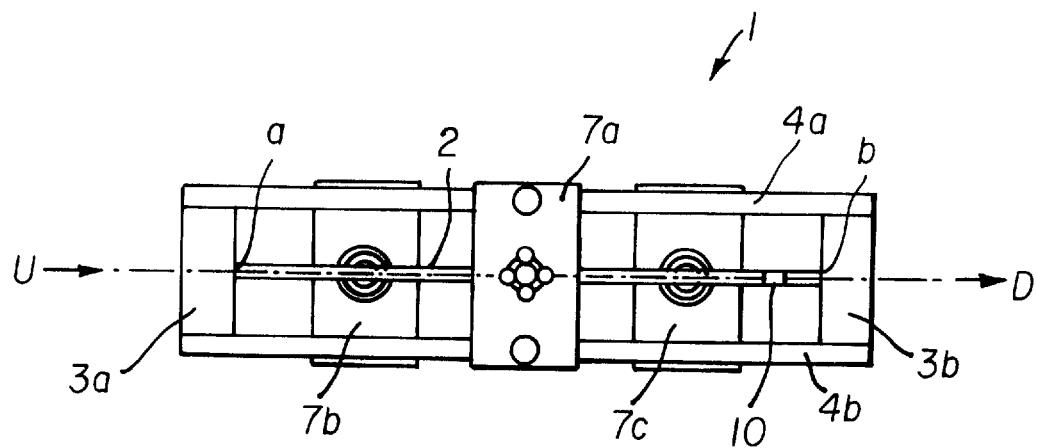
FIG. 1 is a top plan view of a first embodiment of a mass flow meter according to the present invention.

FIG. 1 is a top plan view of a first embodiment of a mass flow meter according to the present invention. A detector unit 1 of the first embodiment has a straight measuring tube 2 that is fixed at nodes of vibration by fixers 3a and 3b, respectively. The mass flow meter also has reinforcing bars 4a and 4b connecting the fixers 3a and 3b. The fixers 3a, 3b and the reinforcing bars 4a, 4b are integrated into a unitary rectangular frame. The fluid in question flows from side U to the side D, as illustrated in FIG. 1.

Figure 2:
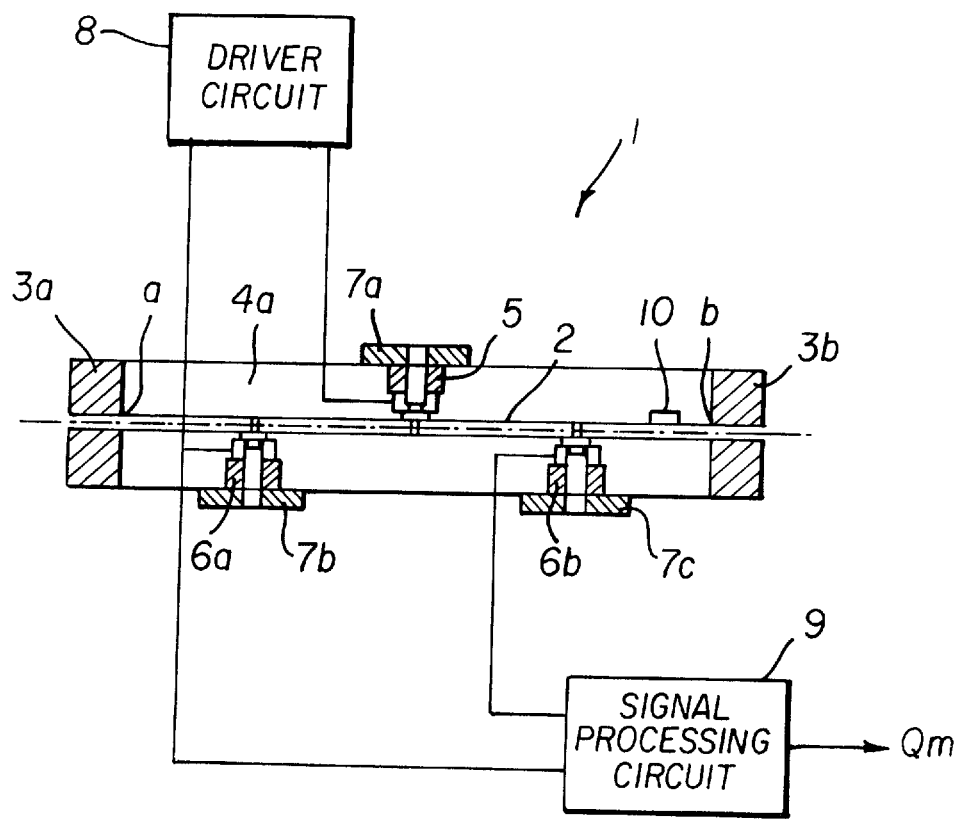
FIG. 2 is a cross section of the mass flow meter of FIG. 1.

FIG. 2 is a cross section of the mass flow meter of FIG. 1. Referring to FIG. 2, a driver 5 is fixed to the center of the vibrating section of the measuring tube 2 and on an adapter 7a. Sensors 6a and 6b which detect the vibration of the measuring tube 2 are installed symmetrically on the upstream side and the downstream side on the measuring tube 2 and on respective adapters 7b and 7c. The adapters 7a, 7b and 7c are disposed between the reinforcing bars 4a and 4b. The measuring tube 2 is vibrated at the resonant frequency by the driver circuit 8 and the driver 5 with the positions a and b thereof fixed as the nodes of vibration. Signals detected by the sensors 6a and 6b are converted in a signal processing circuit 9 to a signal Qm indicative of a mass flow rate of the fluid in question.

In the structure described above, the Coriolis force is generated perpendicularly to the flow velocity of the fluid flowing through the measuring tube 2. The direction of the Coriolis force is opposite on the upstream side to that on the downstream side separated from one another by the driver 5 positioned on the boundary between the upstream section and the downstream section. Therefore, a phase difference (time difference) is generated in proportion to the mass flow rate between the sensors 6a and 6b disposed on the upstream side and the downstream side, respectively.

The mass flow meter of FIG. 1, provided with a straight measuring tube, shows following merits which are the reversal of the drawbacks of the curved measuring tube: (1) low pressure loss; (2) it is easy to clean the measuring tube; (3) the fluid is drained easily after the measurement is over; and,(4) the outer dimensions of the mass flow meter are small. However, since the measuring tube 2 is fixed at both ends of its vibrating section by the fixers 3a, 3b and the reinforcing bars 4a, 4b, stress or strain is caused in the axial direction of the measuring tube 2 by temperature changes of the fluid or the environment when the temperature difference is caused between the measuring tube 2 and the fixers 3a, 3b or the reinforcing bars 4a, 4b. Stress or strain is also caused in the axial direction of the measuring tube 2 by the difference of the thermal expansion coefficients between the measuring tube 2 and the fixers 3a, 3b or the reinforcing bars 4a, 4b when the temperature of the detector unit 1 changes uniformly.

The as measured value of the mass flow rate is usually measured by the mass flow meter of the first embodiment having a straight measuring tube, is changed by the Young's modules, second moment of area, length, axial force, etc. of the measuring tube. Since the stress or strain caused in the axial direction of the measuring tube 2 further changes the parameters described above, the measured mass flow rate is changed to further cause a measurement error. The measurement error may be reduced and the measurement accuracy may be improved by installing a strain sensor (comprised of a piezoelectric element or a strain gauge) on the measuring tube 2 for measuring the strain change in the axial direction of the measuring tube 2, and by correcting the measured mass flow rate based on the strain detected by the strain sensor.

It is preferable to conduct the correction in the following way. The as measured mass flow rate value (phase difference or time difference in this case) may be divided into a part corresponding to the substantial mass flow rate and a part remaining when the mass flow rate is zero (zero point offset). Usually, the strain in the axial direction of the measuring tube affects both of these parts differently. Therefore, the measurement accuracy may be improved more by correcting the as measured mass flow rate value by the measured strain in the ways different from a part to another of the measured mass flow rate value.

An example of the correction will be explained in greater detail. In a case in that the part (zero point offset) Qz, remaining even when the mass flow rate is zero in the as measured mass flow rate value Qm, may be assumed to change linearly with the strain value S detected in the axial direction of the measuring tube, Qz is corrected as follows.

$$Qzc = Qz \cdot (1 + \alpha sz \cdot S) \quad (1)$$

Here, Qzc is a zero point offset after correction, and $\alpha sz$ is a correction factor per unit strain for the zero point offset.

The substantial part Qs corresponding to the as measured substantial mass flow rate is expresses as follows.

$$Qs = Qm - Qzc \quad (2)$$

When this Qs may be assumed to change linearly with the strain value S detected in the axial direction of the measuring tube, Qs is corrected as follows.

$$Qmc = Qs \cdot (1 + \alpha ss \cdot S) = [Qm - Qz(1 + \alpha sz \cdot S)] \cdot (1 + \alpha ss \cdot S) \quad (3)$$

Here, Qmc is a substantial mass flow rate after correction, and $\alpha ss$ is a correction factor per unit stain for the part corresponding to the substantial mass flow rate.

Though the linear correction is applied to the as measured mass flow rate in the above example, higher order correction may be applied depending on the characteristics of the mass flow meter.

The influential parameters (Young's modules, second moment of area, length, etc. of the measuring tube) which affect the as measured mass flow rate changes with the temperature of the measuring tube 2. The influence of the temperature change of the parameters is combined with the influence of the strain caused in the axial direction of the measuring tube. For example, the second moment of area of the measuring tube changes in a combined fashion through the change by the temperature and the thermal expansion coefficient of the measuring tube and through the change by the strain in the axial direction of the measuring tube and the modules of transverse elasticity of the measuring tube. The length of the measuring tube changes in a combined fashion through the change by the temperature and the thermal expansion coefficient of the measuring tube and through the change by the strain in the axial direction of the measuring tube and the modules of longitudinal elasticity of the measuring tube.

Figure 3:
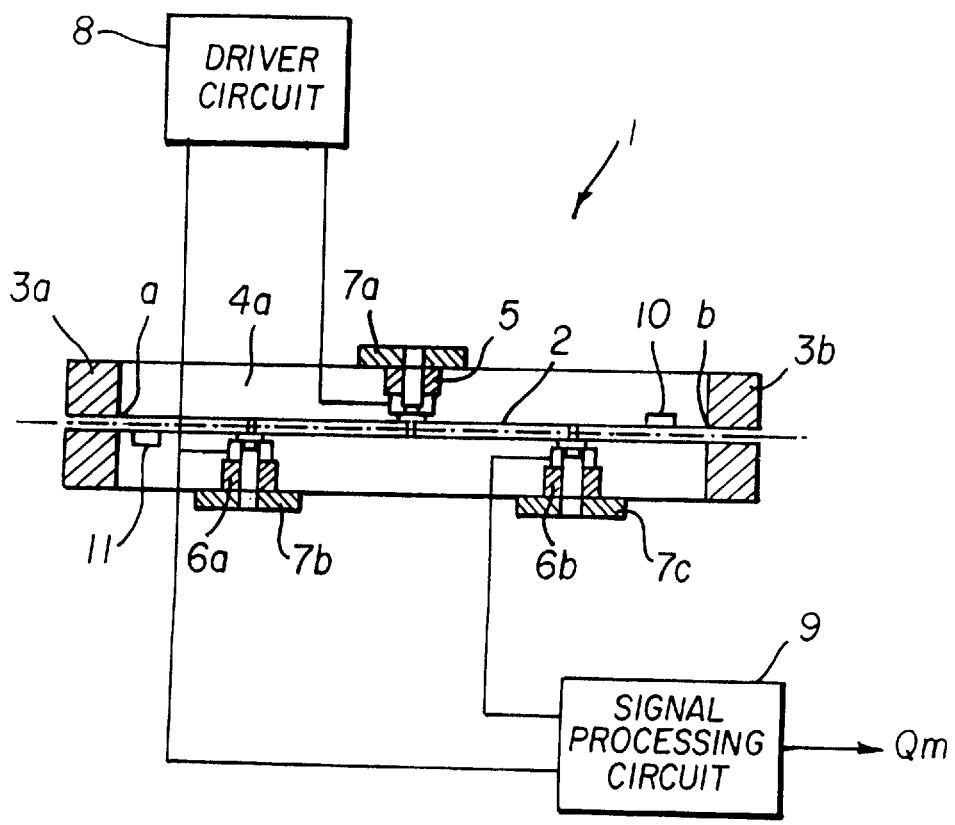
FIG. 3 is a cross section of a second embodiment of a mass flow meter according to the present invention.

FIG. 3 is a cross section of a second embodiment of a mass flow meter according to the present invention. The second embodiment is different from the first embodiment in that a temperature sensor 11 is also installed on the measuring tube 2 for measuring the temperature of the measuring tube 2. Therefore, the measurement accuracy is further improved by combining the temperature of the measuring tube 2 detected by the temperature sensor 11 and the strain in the axial direction of the measuring tube detected by the strain sensor 10. In this occasion, it is preferable to divide the as measured mass rate value into a part corresponding to the substantial mass flow rate and a part remaining when the mass flow rate is zero (zero point offset), and to conduct corrections separately based on the temperature and the strain in the axial direction of the measuring tube.

An example of the correction will be explained in further detail. In a case in that the part (zero point offset) Qz, remaining even when the mass flow rate is zero in the as measured mass flow rate value Qm, may be assumed to change linearly with the temperature and the strain value S detected in the axial direction of the measuring tube, Qz is corrected as follows.

$$Qzc = Qz \cdot (1 + \alpha sz \cdot S) \cdot [1 + \alpha tz \cdot (Tt - Ts)] \quad (4)$$

Here, Ts is a reference temperature, and $\alpha tz$ is a correction factor per unit temperature for the zero point offset.

The substantial part Qs corresponding to the as measured substantial mass flow rate is expressed as follows.

$$Qs = Qm - Qzc$$

When this Qs may be assumed to change linearly with the strain value S detected in the axial direction of the measuring tube and the temperature Tt of the measuring tube, Qs is corrected as follows.

$$Qmc = Qs \cdot (1 + \alpha ss \cdot S)[1 + \alpha ts \cdot (Tt - Ts)] = [Qm - Qz(1 + \alpha sz \cdot S)(1 + \alpha tz \cdot (Tt - Ts))](1 + \alpha ss \cdot S)[1 + \alpha ts \cdot (Tt - Ts)] \quad (5)$$

Here, $\alpha ts$ is a correction factor per unit temperature for the part corresponding to the substantial mass flow rate.

Though the linear correction is applied to the as measured mass flow rate in the above example, higher order correction may be applied depending on the characteristics of the mass flow meter.

Figure 4:
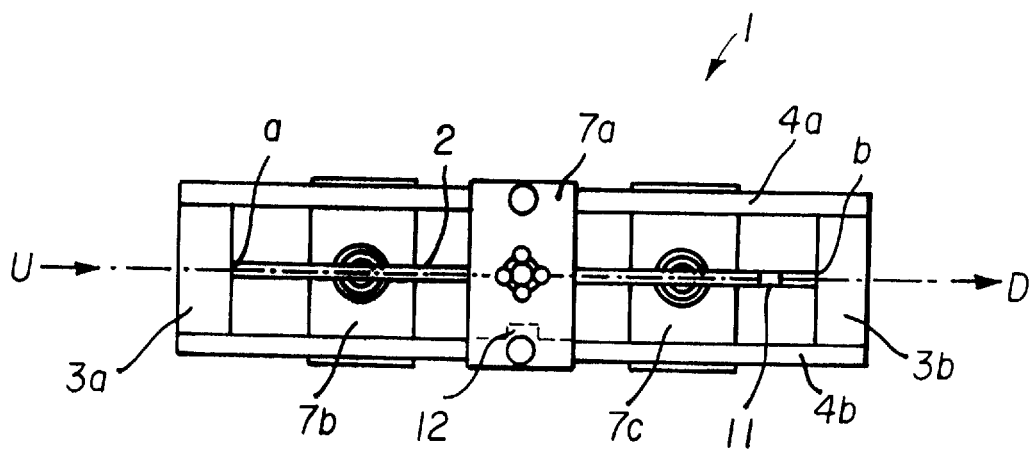
FIG. 4 is a top plan view of a third embodiment of a mass flow meter according to the present invention.

FIG. 4 is a top plan view of a third embodiment of a mass flow meter according to the present invention. Referring now to FIG. 4, the third embodiment is different from the first and second embodiments in that a temperature sensor 12 is installed on the center of the reinforcing bar 4b for measuring the temperature of the frame comprised of the fixers 3a, 3b and the reinforcing bars 4a, 4b and a temperature sensor 11 is installed on the measuring tube 2 on the right hand side thereof for measuring the temperature of the measuring tube 2.

In FIG. 4, since all the stress exerted from outside is exerted to the frame and not exerted directly to the measuring tube 2, the influence of the external stress or strain caused in the axial direction of the measuring tube 2 is reduced to a negligible amount. In this occasion, the strain caused in the axial direction of the measuring tube 2 may be assumed to be governed by the temperatures, temperature difference and the thermal expansion coefficients of the measuring tube 2 and the frame. Since the thermal expansion coefficients are determined by the materials, it is possible to estimate the strain in the axial direction of the measuring tube 2 from the temperatures of the measuring tube 2 and the frame.

Therefore, by detecting the temperatures of the measuring tube 2 and the frame with the sensors 11 and 12, the temperature of the measuring tube 2 as well as the strain caused in the axial direction of the measuring tube 2 are determined. By correcting the as measured mass flow rate with these detected values, the measurement accuracy may be improved. In this occasion, it is preferable to divide the as measured mass rate value into a part corresponding to the substantial mass flow rate and a part remaining when the mass flow rate is zero (zero point offset), and to conduct corrections separately.

Since the strain sensor 10 is not installed on the measuring tube 2 of the third embodiment, the influence of the strain sensor 10 to the vibrating measuring tube 2 can be suppressed more as compared with the first and the second embodiment where the strain sensor 10 is installed on the measuring tube 2.

An example of the correction will be explained more in detail. The temperature difference Td between the frame and the measuring tube 2 is expressed by the temperature Tb of the frame as follows.

$$Td = Tt - Tb \qquad (6)$$

When the thermal expansion coefficients of the frame (exactly describing, the reinforcing bars 4a, 4b in FIG. 4) and the measuring tube 2 are same, the detected value of the strain S caused in the axial direction of the measuring tube 2 may be assumed to be proportional to Td. By considering in the same way as before, a following equation is obtained.

$$Qmc = [Qm - Qz(1 + \alpha dz \cdot Td)(1 + \alpha tz \cdot (Tt - Ts))](1 + \alpha ds \cdot Td)[1 + \alpha ts \cdot (Tt - Ts)] \qquad (7)$$

Here, $\alpha dz$ is a correction factor per unit temperature difference for the zero point offset, and a ds is a correction factor per unit temperature difference for the part corresponding to the substantial mass flow rate.

When the thermal expansion coefficients of the frame (exactly describing, the reinforcing bars 4a, 4b in FIG. 4) and the measuring tube 2 are different from one another, the detected value of the strain S caused in the axial direction of the measuring tube 2 is expressed by the thermal expansion coefficient $\alpha tb$ of the frame and the thermal expansion coefficient $\alpha tt$ of measuring tube as follows.

$$S = \alpha tb(Tb - TS) - \alpha tt(Th - TS)$$

Then, by using this S and by considering in the same way as before, a following equation is obtained.

$$Qmc = [Qm - Qz(1 + \alpha sz \cdot S)(1 + \alpha tz \cdot (Tt \cdot Ts))](1 + \alpha ss \cdot S)(1 + \alpha ts \cdot (Tt - Ts)) \qquad (8)$$

Though the linear correction is applied to the as measured mass flow rate in the above example, higher order correction may be applied depending on the characteristics of the mass flow meter.

Figure 5:
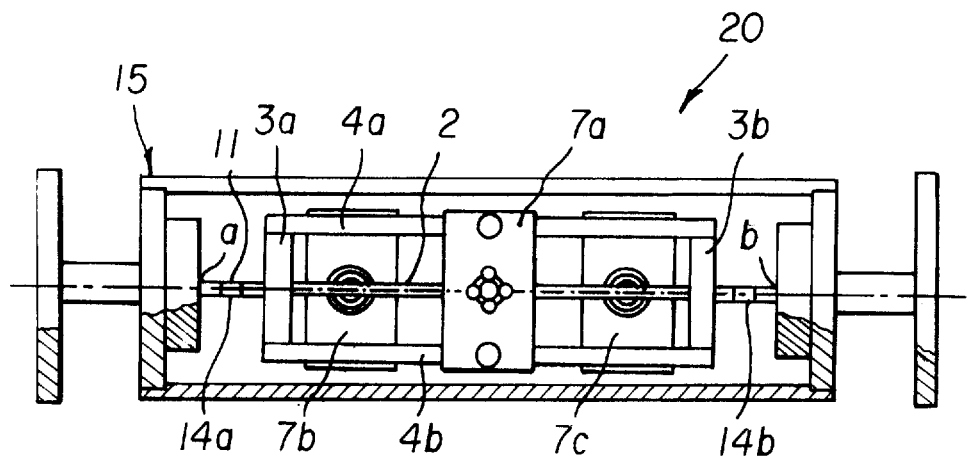
FIG. 5 is a top plan view of a fourth embodiment of a mass flow meter according to the present invention.
Figure 6:
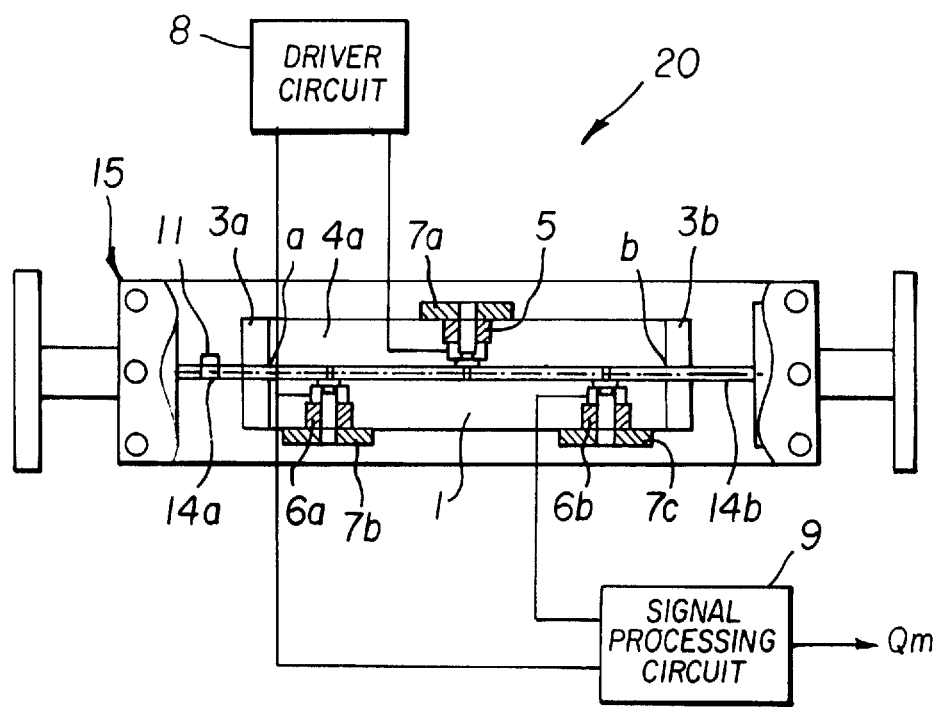
FIG. 6 is a cross section of the mass flow meter of FIG. 5.
Figure 7:
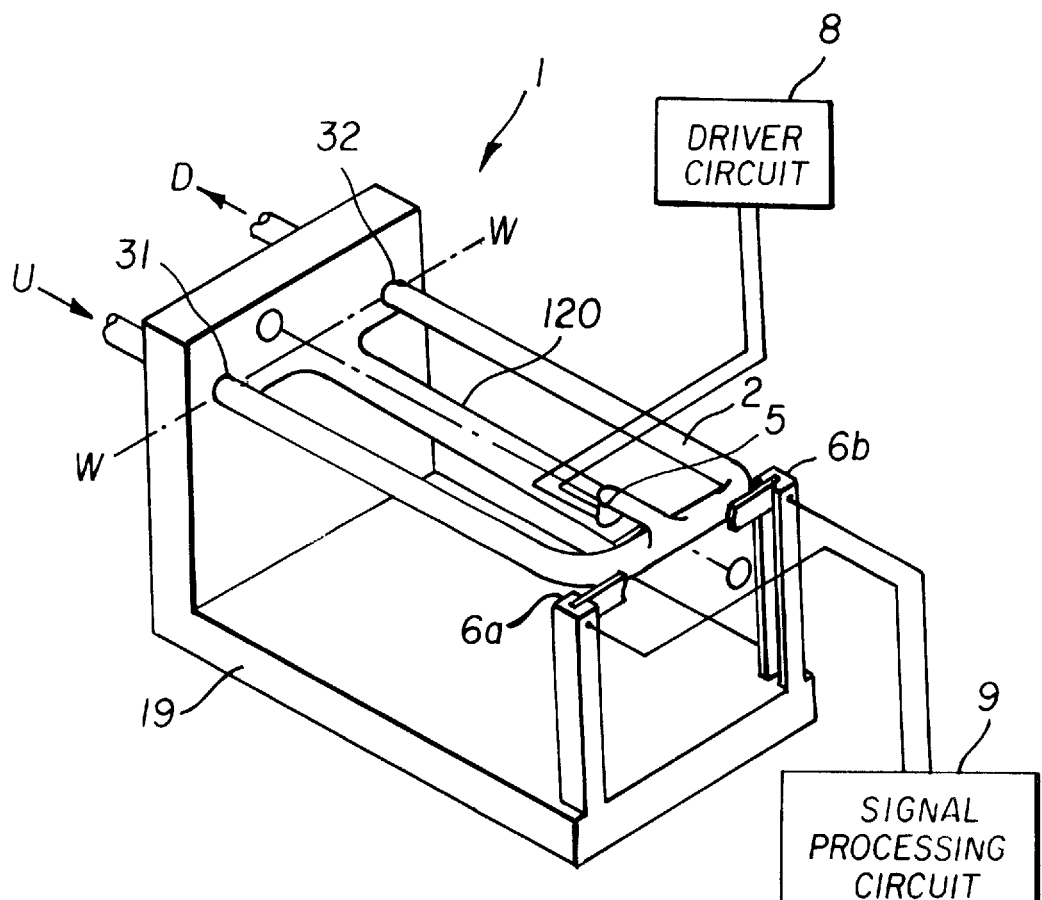
FIG. 7 is an isometric view of a conventional mass flow meter.

FIG. 5 is a top plan view of a fourth embodiment of a mass flow meter according to the present invention. FIG. 6 is a cross section of the mass flow meter of FIG. 5. In the fourth embodiment, a detector unit 20 is suspended in a housing 15 at predetermined point of extended sections 14a, 14b of the measuring tube 2. By installing a temperature sensor 11 on one of the extended sections 14a for detecting the temperature of the measuring tube 2, the influence of the temperature sensor 11 affecting to the vibrating measuring tube 2 may be suppressed as compared with the measuring tube 2 with a temperature sensor installed on its vibrating section. In the fourth embodiment, it is not always necessary to execute corrections separately on the part corresponding to the substantial mass flow rate and on the zero point offset. In some cases, the correction on the zero point offset may be omitted.

According to an aspect of the invention, correction is executed separately on the part corresponding to the substantial mass flow rate and on the part corresponding to the zero point offset based on the output signals from the sensor for detecting the state parameters of the measuring tube, e.g. a strain sensor for detecting the strain caused in the axial direction of the measuring tube, a temperature sensor for detecting the temperature of the measuring tube, etc. As a result, the measurement accuracy is improved.

Correction is executed separately on the part corresponding to the substantial mass flow rate and on the part corresponding to the zero point offset based on the output signals from two temperature sensors. As a result, the measurement accuracy is improved to the same extent as by the stain and temperature sensors but more easily and cheaply.

According to another aspect of the invention, influence of the installed temperature sensor to the vibration of the measuring tube is avoided and the measurement accuracy is further improved.

As a result, the improvement of the measurement accuracy is facilitated while maintaining the inherent merits of the straight tube mass flow meters including (1) low pressure loss, (2) ease in cleaning the measuring tube, (3) ease in draining the remaining fluid out of the measuring tube, and (4) small outer dimensions.

The invention has been described with reference to certain preferred embodiments thereof. It will be understood, however, that variations and modifications are possible within the scope of the appended claims.

What is claimed is:

1. A mass flow meter for measuring a mass flow rate of a fluid based on a reactive force generated by accelerating the fluid as it flows through a straight measuring tube, the mass flow meter comprising:

a sensing means for detecting a state of the measuring tube, wherein said state comprises at least one of a strain and a temperature of the measuring tube; and a correcting means for correcting an as measured value of the mass flow rate based on the output of the sensing means, wherein the correcting means comprises:

a mass flow rate correcting means for correcting a part of the as measured value of the mass flow rate corresponding to a substantial mass flow rate of the fluid; and a zero point correcting means for correcting a part of the as measured value corresponding to a zero point offset remaining when the fluid is not flowing;

wherein the zero point offset (Qzc) is calculated by using a known relationship between the zero-point offset and the state of the measuring tube based on the output of the sensing means;

wherein the substantial mass flow rate value (Qs) is obtained by subtracting the zero-point offset value (Qzc) from the as measured value of the mass flow rate (Qm); and wherein a substantial mass flow rate after correction (Qmc) is obtained as a result of correcting the substantial mass flow rate value (Qs) based on the output of the sensing means.

2. The mass flow meter according to claim 1, wherein the sensing means comprises a strain sensor for detecting a strain in the axial direction of the measuring tube.

3. The mass flow meter according to claim 1, wherein the sensing means comprises a temperature sensor for detecting a temperature of the measuring tube.

4. The mass flow meter according to claim 1, wherein the sensing means comprises a strain sensor for detecting a strain in the axial direction of the measuring tube and a temperature sensor for detecting a temperature of the measuring tube.

5. The mass flow meter according to claim 1, wherein the mass flow meter further comprises a frame for fixing the measuring tube at nodes of vibration thereof, and the sensing means comprises a first temperature sensor for detecting a temperature of the measuring tube and a second temperature sensor for detecting a temperature of the frame.

* * * * *